United States Patent
Saito et al.

(10) Patent No.: US 8,246,848 B2
(45) Date of Patent: Aug. 21, 2012

(54) PROCESS FOR PRODUCING BASE MATERIAL FOR FORMING HEAT SHIELDING FILM

(75) Inventors: Masanori Saito, Matsusaka (JP); Shigeo Hamaguchi, Matsusaka (JP); Yoshinori Akamatsu, Matsusaka (JP); Soichi Kumon, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 749 days.

(21) Appl. No.: 12/093,702

(22) PCT Filed: Sep. 21, 2006

(86) PCT No.: PCT/JP2006/318740
§ 371 (c)(1),
(2), (4) Date: May 14, 2008

(87) PCT Pub. No.: WO2007/058016
PCT Pub. Date: May 24, 2007

(65) Prior Publication Data
US 2009/0087573 A1    Apr. 2, 2009

(30) Foreign Application Priority Data

| Nov. 15, 2005 | (JP) | 2005-330064 |
| Mar. 1, 2006 | (JP) | 2006-054662 |
| Jul. 6, 2006 | (JP) | 2006-186222 |
| Sep. 8, 2006 | (JP) | 2006-243649 |

(51) Int. Cl.
*E04B 1/74* (2006.01)

(52) U.S. Cl. ............ 252/62; 427/421.1; 106/18.12; 106/153.1

(58) Field of Classification Search ........ 427/421.1; 252/62
See application file for complete search history.

(56) References Cited

U.S. PATENT DOCUMENTS

| 5,518,810 A | 5/1996 | Nishihara et al. |
| 2004/0209084 A1* | 10/2004 | Yamaya et al. ............ 428/421 |
| 2005/0158566 A1 | 7/2005 | Higuchi et al. |
| 2005/0164014 A1* | 7/2005 | Tomonaga et al. ......... 428/432 |

FOREIGN PATENT DOCUMENTS

| EP | 1 541 536 A1 | 6/2005 |
| EP | 1 288 270 B1 | 4/2006 |
| JP | 7-70481 A | 3/1995 |
| JP | 7-70482 A | 3/1995 |
| JP | 8-41441 A | 2/1996 |
| JP | 2000-177064 A | 6/2000 |
| JP | 2003-64308 A | 3/2003 |
| JP | 2004-338985 A | 12/2004 |
| JP | 2005-200546 A | 7/2005 |
| JP | 2005200546 * | 7/2005 |
| WO | WO 2004/011381 A1 | 2/2004 |

OTHER PUBLICATIONS

International Search Report dated Dec. 26, 2006 with an English translation of the pertinent portions (Five (5) pages).

* cited by examiner

*Primary Examiner* — Timothy Meeks
*Assistant Examiner* — Nathan T Leong
(74) *Attorney, Agent, or Firm* — Crowell & Moring LLP

(57) ABSTRACT

There is provided a production process of a heat-ray shielding film-formed base member comprising the steps of mixing a sol solution, formed by using a starting raw material of trialkoxysilane or trialkoxysilane and tetraalkoxysilane, with a solution in which tin-doped indium oxide ultra-fine particles are dispersed, to make a treatment agent; and applying the treatment agent to a base member. In this production process, the treatment agent has an organic solvent having a boiling point of 100-200° C. as a dispersion medium, and the application is conducted by a means by bringing a member retaining the treatment agent into contact with the base member or by a means by spraying the treatment agent, thereby adjusting haze value of the film to be formed to 0.5% or less.

9 Claims, No Drawings

PROCESS FOR PRODUCING BASE MATERIAL FOR FORMING HEAT SHIELDING FILM

TECHNICAL FIELD

The present invention relates to a production process of a heat-ray shielding film-formed base member by applying a treatment agent.

BACKGROUND OF THE INVENTION

Hitherto, glass base members capable of shielding near-infrared rays as architectural or vehicular windows or the like have attracted attention. Of the sunshine energy, near-infrared ray is significant in thermal action. Therefore, the prevention of its flow into the interior is expected to achieve the improvement of comfortableness, the improvement of air-conditioning efficiency and the like. In architectural uses and vehicular uses, it is requested to have durability, such as abrasion resistance and weather resistance, and radio transmission capability of wavelength bands used in cellular phone, TV, radio, ITS and the like, while having a sufficient heat-ray shielding capability.

Under such background, a heat-ray shielding film-formed base member formed from a treatment agent obtained by a mixing of tin-doped indium oxide (ITO) ultra-fine particles with a binder component or the like attracts attention. For example, in Patent Publications 1 to 3, there are disclosed base members that have a heat-ray cut-off effect and are obtained by coating a base member with a treatment agent obtained by a mixing of ITO fine particles with a binder component formed of an alkoxide, such as Si, Al, Zr and Ti, or organic resin.

Patent Publication 1: Japanese Patent Laid-open Publication 07-070482
Patent Publication 2: Japanese Patent Laid-open Publication 08-041441
Patent Publication 3: Japanese Patent Laid-open Publication 2004-338985

SUMMARY OF THE INVENTION

As mentioned above, a process for producing a heat-ray shielding film-formed base member by applying a treatment agent will do, as long as a means for applying it to a base member is provided. Therefore, it has a high potential as a process for obtaining the base member with low cost. However, depending on the means for applying the treatment agent, transfer efficiency of the treatment agent to the base member is low, and most of the treatment agent may be wasted during the production course.

In recent years, the price of tin-doped indium oxide (ITO) ultra-fine particles, which are one of main raw materials of the treatment agent, has risen dramatically. Therefore, a technology development to efficiently transfer the treatment agent to the base member is indispensable for producing a heat-ray shielding film-formed base member with low cost.

In view of the above, for producing a heat-ray shielding film-formed base member, having sufficient heat-ray shielding capability and abrasion resistance and weather resistance, with which it can sufficiently be used as an architectural-use or vehicular-use window glass or the like, with a lower cost, it is a task of the present invention to provide the base member that is improved in transfer of the treatment agent to the base member.

In the present invention, we have set a goal that most of the treatment agent used is transferred to the base member in terms of the transfer efficiency of the treatment agent to the base member.

The coating method for achieving high transfer efficiency of the treatment agent to the base member is a coating method by a means that brings a member retaining the treatment agent into contact with the base member, which is a so-called coating with hands or means comparable to that, or a coating method by spraying by a spray or the like. In these coating methods, however, the applied treatment agent must be subjected to leveling homogeneously on the base member by its own action.

The degree of achieving leveling of the applied treatment agent, that is, leveling property, has a great influence on the external quality such as haze of the film to be formed. Therefore, it is necessary to provide a treatment agent having a superior leveling property for efficiently applying the treatment agent to the base member. As a result of examining factors against leveling property of the treatment agent applied to the base member, there was obtained a finding that the volatilization rate of the solvent of the treatment agent is a factor having the greatest influence on leveling property of the treatment agent.

Since the treatment agent serving in the production process of a heat-ray shielding film-formed base member of the present invention is superior upon coating the base member, it is possible to efficiently transfer the treatment agent onto the base member. Therefore, the production process of a heat-ray shielding film-formed base member according to the present invention makes it possible to produce a heat-ray shielding film-formed base member, which has sufficient heat-ray shielding capability and abrasion resistance and weather resistance, with which it can sufficiently be used as an architectural-use or vehicular-use window glass or the like, with a lower cost.

The present invention was made by an examination against a background of the above-mentioned technological idea. That is, the production process of a heat-ray shielding film-formed base member of the present invention is a production process of the base member, in which transfer efficiency of the treatment agent onto the base member is improved. It is characterized in that it comprises the step of mixing a sol solution, formed by using a starting raw material of trialkoxysilane or trialkoxysilane and tetraalkoxysilane, with a solution in which tin-doped indium oxide (hereinafter, it may be referred to as ITO) ultra-fine particles are dispersed, to make a treatment agent, and the step of applying the treatment agent to the base member, that the treatment agent has an organic solvent having a boiling point of 100-200° C. as a dispersion medium, and that the application is conducted by a means in which a member retaining the treatment agent is brought into contact with the base member or by a means by spraying the treatment agent, thereby adjusting haze value of the film to be formed to 0.5% or less.

DETAILED DESCRIPTION

Since the treatment agent serving in the production process of a heat-ray shielding film-formed base member of the present invention is superior in leveling property upon coating the base member, the treatment agent can efficiently be transferred onto the base member. Therefore, the production process of a heat-ray shielding film-formed base member according to the present invention makes it possible to produce a heat-ray shielding film-formed base member, which has sufficient heat-ray shielding capability and abrasion resistance and weather resistance, with which it can sufficiently be used as an architectural-use or vehicular-use window glass or the like, with a lower cost.

In the production process of a heat-ray shielding film-formed base member of the present invention, the treatment agent is obtained by mixing a sol solution, prepared by using a starting raw material of trialkoxysilane or trialkoxysilane and tetraalkoxysilane, with a solution in which ITO ultra-fine particles are dispersed. By containing a chemical species having a boiling point of 100-200° C. in the solvent in the treatment agent, it becomes possible to suitably retard volatilization of the solvent from the treatment agent applied to the base member, while securing dispersiveness of the ITO ultra-fine particles in the treatment agent, resulting in a considerable improvement in leveling property of the treatment agent. Herein, the reason why the boiling point is adjusted to the above range is that it becomes impossible to suitably retard volatilization of the solvent if it is less than 100° C. and that too much time is necessary for volatilization of the solvent if it is higher than 200° C.

Upon preparing the sol solution, it is preferable to prepare the sol solution by using an organic solvent having a boiling point of 100-200° C. as a dispersion medium of the sol solution, since the steps of preparing the treatment agent are simplified.

The heat-ray shielding film is required to have a film thickness of 1 μm or greater for obtaining a sufficient heat-ray shielding property, since the film thickness has a great influence on the amount of absorption of infrared rays having a wavelength of 0.81 μm or greater. In addition, it is preferable to have a sufficient abrasion resistance in practice for the use as an architectural or vehicular window glass. In order to satisfy these demands, the selection of the ultra-fine particles and the binder component used as a binder of the ultra-fine particles is important.

The binder component of the heat-ray shielding film obtained by the present invention is a silicon compound. It is obtained by using trialkoxysilane or trialkoxysilane and tetraalkoxysilane as a starting raw material. The alkoxysilane is previously turned into a sol, and it is mixed with a solution in which ITO ultra-fine particles are dispersed. With this, it is possible to produce a treatment agent without having aggregation and sedimentation.

In order to obtain the above-mentioned thick film, it is preferable to use one having a less occurrence of stress in the film when the applied treatment agent turns into gel. If stress occurring upon gelation is large, the film tends to have cracks, thereby damaging external appearance.

A silicon compound formed from trialkoxysilane having three reaction active groups makes a spatial clearance. Therefore, stress occurring upon gelation is relatively small, and cracks do not tend to occur. Since it has three reaction active groups, one silicon compound forms three strong siloxane bonds. Therefore, it is possible to form a cross-linked network. In the case of using one having two or less reaction active groups, however, the silicon compound makes a more spatial clearance, but only a chain-like network is formed. Therefore, the film is lowered in abrasion resistance and the like.

In order to form the film obtained by the present invention into one having a sufficient abrasion resistance in practical use as an architectural or vehicular window glass, it is preferable to increase the cross-liking density of the silicon compound of the binder component. For that, it is possible to use not only trialkoxysilane, but also tetraalkoxysilane having four reaction active groups, as a starting raw material of the silicon compound of the binder component. If tetraalkoxysilane is used as the starting raw material, a film that is high in hardness and superior in abrasion resistance tends to be obtained. For example, a film that is 5H or greater in pencil hardness tends to be obtained. By increasing the amount of its introduction, a film that is 7H or greater tends to be obtained.

The use of tetraalkoxysilane is effective for forming a high-hardness film. However, the use of the chemical species tends to decrease a spatial clearance in the cross-linked structure upon gelation during the film-forming process. Therefore, cracks tend to occur in the film. In view of this, it is preferable to adjust by weight ratio the amount of the silicon compound derived from tetraalkoxysilane in the sol solution to four or less times the amount of the silicon compound derived from trialkoxysilane.

The use of tetraalkoxysilane is preferable, since it provides the obtained film with a vitreous external appearance or touch. If a heat-ray shielding film-formed base member that has vitreous touch is used for an automotive side door window, the window is improved in sliding property upon the up-and-down movement of the window and does not tend to have occurrence of chatter. In view of this, it is preferable to use a heat-ray shielding film-formed base member, which has been formed by using tetraalkoxysilane, for a window that is moved up-and-down, such as an automotive side door window.

In view of external appearance, touch of the film, the obtainment of a hardness that is 7H or more in pencil hardness, abrasion resistance of the film and the like, it is preferable to adjust by weight the amount of a silicon compound derived from tetraalkoxysilane in the sol solution to not less than one time the amount of a silicon compound derived from trialkoxysilane.

The amount of the silicon compound, which is a base of the above-mentioned numerical limitation, is based on the amount of silicon oxide compound formed from tetraalkoxysilane or trialkoxysilane of the raw material.

By applying the treatment agent on the base member through a means of bringing a member retaining the treatment agent into contact with the base member or a means by spraying the treatment agent, it is possible to increase transfer rate of the treatment agent onto the base member and to obtain a heat-ray shielding film-formed base member that has a haze value of 0.5% or less and is superior in transmission, heat-ray shielding property, hardness, durability and the like. From the viewpoint of transmission, it is preferable to have haze value of the film as low as possible. From the production efficiency of a heat-ray shielding film-formed base member, it is optional to adjust haze value of the film to 0.1% or greater and furthermore 0.2% or greater.

The above-mentioned haze value is defined by the value obtained by a method based on a measurement method of the haze value by a haze meter mentioned in an item of abrasion resistance of JIS R 3212 (1998). In the measurement of the haze value according to the rule using a heat-ray shielding film-formed base member obtained by the present invention, the measurement is conducted with "base member+film". In case that the haze value of the base member is as low as 0.2%, the measured value obtained with the film-formed base member may be considered as the haze value of the film. In case that the haze value of the base member exceeds 0.2%, the haze value of the base member is lowered to 0.2% or less by making the base member thin. After forming a heat-ray shielding film-formed base member by the same method using a base member having a haze value of 0.2% or less, the haze value obtained by the base member may be used correspondingly as the haze value of the film.

The solvent in the treatment agent is derived from the solvent in the sol solution and the solvent in the solution in which ITO ultra-fine particles are dispersed. By increasing the proportion of a high-boiling-point solvent in the solvent in the treatment agent, leveling property is improved. As a result of various examinations on leveling property, it was found to be preferable to adjust the amount of an organic solvent having a boiling point of 100-200° C. to 30 weight % or greater in the solvent in the treatment agent.

For an efficient production of the heat-ray shielding film-formed base member, it is desirable that the amount of the silicon compound and the ITO ultra-fine particles to be added to the treatment agent is 5 wt % to 50 wt %, more preferably 15 wt % to 40 wt %, relative to the total amount of the treatment agent.

It is preferable to make the film have a pencil hardness of 3H or greater by conducting a baking at 50-300° C. after applying the treatment agent to the base member. Assuming that the heat-ray shielding film-formed base member is used as an automotive or architectural window, a film having a higher hardness is preferable. A film having a hardness of 3H to 9H in pencil hardness is practical. By conducting heating after applying the treatment agent, the film is sintered. In view of practical strength of the film, it is preferable to conduct baking at 50-300° C., preferably 130-300° C.

By lowering the silicon compound concentration, abrasion resistance of the film is lowered. By lowering the ITO fine particles concentration, the heat-ray shielding capability is lowered. Therefore, the weight ratio of the silicon compound in the treatment agent to the tin-doped indium oxide ultra-fine particles is preferably 2:8 to 7:3 for obtaining a composition with which abrasion resistance and heat-ray shielding capability consist with each other.

Upon forming the treatment agent, it is optional to form the treatment agent by adding an organic metal complex as a curing catalyst. By adding the curing catalyst, the obtained heat-ray shielding film-formed base member is improved in hardness and abrasion resistance. Therefore, it is preferable. The curing catalyst may be by weight up to 0.05 times the amount of the silicon compound in the treatment agent. With more than 0.05 times that, the effect of the achievement of the catalytic effect relative to the added amount tends to become obscure. Therefore, it is not necessary to add the catalyst in large amount. On the other hand, it is preferable to add the curing catalyst in an amount by weight that is not less than 0.0001 times the amount of the silicon compound in the treatment agent.

As the curing catalyst, particularly a metal complex, such as tin, aluminum, titanium and zirconium, is more preferably used. Herein, the organic metal complex is preferably fluoride, chloride, bromide, iodide, acetate, nitrate, sulfate, acetylacetonato or the like.

The amount of the silicon compound, which becomes a basis of the numerical limitations in the ratio of the silicon compound to the ITO ultra-fine particles and the ratio of the silicon compound to the curing catalyst, is based on the amount of a silicon oxide compound formed from tetraalkoxysilane or trialkoxysilane of the raw material.

It is known that the ITO ultra-fine particles absorb near-infrared rays of 1000 nm or greater. In general, it is known that a substance has an intrinsic plasma resonance frequency, that a light having a wavelength longer than this frequency is reflected, and that a light shorter than that is transmitted. This plasma resonance frequency is known to shift to a shorter wavelength side by the increase of the conductive electron density. It is known that ITO has a conductive electron density that is higher than those of other transparent conductive materials, such as ATO, and therefore absorption starts from around 1000 nm to 1300 nm.

Regarding the ITO ultra-fine particles, it is preferable to use those having an average particle diameter of 200 nm or less, preferably 100 nm or less. In general, it is said that particles having a particle diameter that is around a half of wavelength of a light make its scattering maximum. Therefore, it is preferable that the average particle diameter of the ITO ultra-fine particles is 200 nm, which is a half of 400 nm, the shortest wavelength of the visible light rays, or less, more preferably 100 nm or less.

The average particle diameter is measured by a method based on JIS H 7804 (2005). Presented in this JIS is up to a size of 100 nm in average particle diameter. However, one exceeding 100 nm is measured by using the measurement method of the size of 100 nm in average particle diameter.

The ITO ultra-fine particles are used in a condition that they are dispersed in a dispersion medium. As the dispersion medium, in view of its compatibility with the sol solution, it is preferable to use a dispersion medium containing a major component of an alcohol solvent, particularly a lower alcohol solvent, or a dispersion medium containing a major component of an organic solvent having a boiling point of 100-200° C., which is used as a dispersion medium of silica sol.

As the trialkoxysilane, it is possible to use methyltrimethoxysilane, ethyltrimethoxysilane, propyltrimethoxysilane, isopropyltrimethoxysilane, butyltrimethoxysilane, isobutyltrimethoxysilane, phenyltrimethoxysilane, methyltriethoxysilane, ethyltriethoxysilane, propyltriethoxysilane, isopropyltriethoxysilane, butyltriethoxysilane, isobutyltriethoxysilane, phenyltriethoxysilane, methyltripropoxysilane, ethyltripropoxysilane, propyltripropoxysilane, isopropyltripropoxysilane, butyltripropoxysilane, isobutyltripropoxysilane, phenyltripropoxysilane, methyltriisopropoxysilane, ethyltriisopropoxysilane, propyltriisopropoxysilane, isopropyltriisopropoxysilane, butyltriisopropoxysilane, isobutyltriisopropoxysilane, phenyltriisopropoxysilane, and the like.

Furthermore, it is possible to provide some functions by an organic group of a moiety other than alkoxy group. For example, for the purpose of improving abrasion resistance, it is possible to use 3-glycidoxypropyltrimethoxysilane, 3-glycidoxypropyltriethoxysilane, 5,6-epoxyhexyltriethoxysilane, 5,6-epoxyhexyltriethoxysilane, 2-(3,4-epoxycyclohexyl)ethyltrimethoxysilane, 2-(3,4-epoxycyclohexyl)ethyltriethoxysilane, 3-oxetanylpropyltriethoxysilane and the like, which are provided with epoxy group and oxetanyl group.

In order to improve leveling property of the treatment agent, it is preferable to use a large-size organic group as the organic group of the above-mentioned trialkoxysilane. For example, butyltrimethoxysilane, isobutyltrimethoxysilane, phenyltrimethoxysilane, 3-glycidoxypropyltrimethoxysilane, 3-glycidoxypropyltriethoxysilane, and the like are preferable.

On the other hand, in order to make touch of the obtained film closer to glassy, it is preferable to use a small-size organic group as the organic group of the above-mentioned trialkoxysilane. For example, it is more preferable that the organic group is methyl group, such as methyltrimethoxysilane and methyltriethoxysilane.

As the above-mentioned tetraalkoxysilane, it is possible to use tetramethoxysilane, tetraethoxysilane, tetrapropoxysilane, tetraisopropoxysilane, and the like. As the tri- and tetraalkoxysilanes, it is optional to use respective single types of compounds or to use different types of compounds.

It is desirable that the organic solvent having a boiling point of 100° C. to 200° C. is a chemical species containing a hydroxyl group. This is because it is expected to have a compatibility with trialkoxysilane or trialkoxysilane and tetraalkoxysilane, which are used as the binder component, hydrolysis components of these, alcohols produced by hydrolyses, and the like. Since the treatment agent contains many chemical species containing hydroxyl groups, one suitable for chemical species containing hydroxyl groups is used as the dispersion medium of the ITO ultra-fine particles. Therefore, also from the viewpoint of dispersion stability of the ITO ultra-fine particle, a chemical species containing a hydroxyl group is preferable. Furthermore, in case that the base member is a glass base member, wettability of the treatment agent to the base member is improved in the step of applying the treatment agent to the base member by using a chemical species containing a hydroxyl group as the dispersion medium. This is because, due to the existence of many silanol groups (Si—OH) on the surface of the base member, its affinity with a chemical species containing a hydroxyl group is good. As a result, it has an effect of lowering haze value of the film to be formed.

As the chemical species having a boiling point of 100° C. to 200° C. and containing a hydroxyl group, there are cited alcohol-series solvents such as ethylene glycol, 1-butanol, 2-butanol, 1,2-propanediol and cyclohexanol, Cellosolve-series solvents such as ethylene glycol monomethyl ether, ethylene glycol monoethyl ether, ethylene glycol monobutyl ether, ethylene glycol monoisoamyl ether and ethylene glycol monophenyl ether, propylene glycol monoalkyl ether series such as propylene glycol monomethyl ether, propylene glycol monoethyl ether and propylene glycol monobutyl ether, and the like. In view of compatibility with water or a lower alcohol that has a good compatibility with water, it is preferable to use a propylene glycol monoalkyl ether-series chemical species.

Furthermore, it is optional to add a material that shields particular wavelengths to the treatment agent for the purpose of raising the functionality of the film. For example, it is possible to add a benzophenone derivative, benzotriazole derivative, titanium oxide fine particles, or zinc oxide fine particles for the purpose of shielding ultraviolet rays.

As the base member used in the production process of a heat-ray shielding film-formed base member of the present invention, it is preferable to use an inorganic and transparent glass base member such as a soda-lime glass which is normally used as an architectural-use or vehicular-use glass base and is prepared by a float method or roll-out method. The type of the glass base member is not particularly limited in terms of colorless products, colored products, products combined with other functional films, shape and the like.

For example, it is possible to use flat plate-like products, curved plate-like products, various tempered glass products such as air-quench tempered glass and chemically strengthened glass, and wired glass products. In addition, it is optional to use various glass products such as borosilicate glass, low-expansion glass, zero expansion glass, low-expansion glass-ceramics, zero expansion glass-ceramics, TFT glass, PDP glass, and optical filter base member glass.

Besides glass base member, it is optional to use a resin base member such as polyethylene terephthalate resin, polycarbonate resin, polyvinyl chloride resin, and polyethylene resin.

In recent years, in architectural use and vehicular use, there have been used many green-color-series glass base members that absorb a wavelength region of 700 nm to 1100 nm. Since the wavelength region that can be shielded by the ITO ultra-fine particles is 1000 nm or greater, it is possible to produce a glass base member having a suppressed transmittance in a wide near-infrared wavelength region by forming the heat-ray shielding film-formed base member on the green-color-series glass base member. It is possible by the heat-ray shielding film-formed base member to satisfy the visible light transmittance of 70% or greater that is legally required in vehicular glass windows and to limit solar radiation transmittance to 45% or less.

Since the treatment agent used in the present invention is superior in leveling property after the coating of the base member, the application to the base member using a curved plate-like product is easy. The application to a concave surface, which is a more difficult application, is easy. Therefore, in the present invention, it is possible to produce a heat-ray shielding film-formed base member having a curved shape, with low cost. In the case of applying a heat-ray shielding film-formed base member of a curved shape to windows of vehicular use, the concave surface side becomes an interior side, which is preferable for the film formation. Therefore, the above-mentioned characteristic is preferable for the application of the present invention to vehicular use.

Next, the procedures for carrying out the present invention are explained. A sol solution formed by using alkoxysilane as the starting raw material is obtained, for example, by mixing and stirring given amounts of alkoxysilane, an organic solvent having a boiling point of 100 to 200° C., an acid catalyst and the like.

The time for the stirring is preferably 10 minutes to 20 days, particularly 1 hour to four days, but it is not limited to this in the case of conducting stirring not at room temperature. Heating accelerates the reaction. Therefore, it is possible to shorten the stirring time. As mentioned above, hydrolysis of alkoxysilane can be conducted by adding water and an acid catalyst of small amounts. It is possible to obtain a sol solution through polycondensation by conducting stirring at room temperature or with heating. Herein, in case that two types or more of alkoxysilanes have been used, it is optional to separately conduct hydrolyses followed by mixing or to conduct them together. The preparation method of the sol solution is not limited to the above method. A method, in which one obtained by gradually mixing an acid aqueous solution diluted with solvent with the above-mentioned alkoxysilane diluted with solvent makes it possible to avoid a rapid reaction and obtain a more homogeneous reaction. Therefore, it is preferable.

The acid catalyst is selected from inorganic acids, such as hydrochloric acid, sulfuric acid and nitric acid, and organic acids, such as acetic acid, phthalic acid and succinic acid, depending on the hydrolysis rate of alkoxy group of the alkoxysilane used. It is preferable that the acid catalyst is added in a manner to adjust the pH value in the sol solution to 0 to 5. For example, in the case of methyltriethoxysilane, a gel precipitate tends to occur by a low pH value. Therefore, it is preferable to adjust the pH value to 3-4. The acid catalyst is preferably acetic acid, phthalic acid or the like, which is easy for the adjustment to this pH value.

It is optional to add a very small amount of a leveling agent to the treatment agent for the purpose of improving leveling property. In view of compatibility with the present treatment agent of the present invention, a water-soluble, silicone-series leveling agent is preferable.

The treatment agent is obtained by mixing the sol solution with a solution in which the ITO ultrafine particles are dispersed. The application of the treatment agent to the base member is conducted by a means by bringing a member retaining the treatment agent into contact with the base member or by a means by spraying of the treatment agent.

The means for bringing a member retaining the treatment agent into contact with the base member is a coating method by a so-called coating with hands or means comparable to that. The treatment agent is retained by a means such as impregnation or penetration of the treatment agent into the member such as cloth, sponge, brush or nonwoven fabric, and the member is brought into contact with the base member by a robot, human hand or the like, thereby transferring the treatment agent onto the base member. As a means by spraying of the treatment agent, the treatment agent is sprayed onto the base member with a robot, human hand or the like by a coating method by spraying, thereby transferring the treatment agent onto the base member.

The transfer efficiency of the treatment agent onto the base member is determined by calculating what percentage of the amounts of the silicon compound (the amount reduced to oxide) and the tin-doped indium oxide ultra-fine particles in the treatment agent, that is, the amount of solid matters in the treatment agent, has adhered onto the base member. For example, spin coating method is cited as a coating method that is capable of producing flat thin films. In the case of spin coating method, the amount of solid matter in the treatment agent that adheres onto the base member is about 10-40%, and the remaining 60-90% is thrown away to the outside of the system. In the case of conducting the application by a means that brings a member retaining the treatment agent into contact with the base member, it becomes possible to adjust the transfer efficiency to 80% to 99%.

EXAMPLES

In the following, examples of the present invention are described.
[Evaluation Method of Heat-Ray Shielding Film]
  (1) External Appearance Evaluation
  The external appearance, transmission, and existence or nonexistence of cracks of the heat-ray shielding film were evaluated by visual inspection. Those with no problem were judged as pass (B), and those with problem were judged as failure (F). Those that have no problem in terms of transmission and existence or nonexistence of cracks and the like and that are observed as having a glass-like external appearance film were judged as excellent (A).
  (2) Optical Characteristics
  Using U-4000 made by HITACHI, transmission spectrum of the heat-ray shielding film-formed glass base member was measured. Based on this measurement data, there were determined solar radiation transmittance Ts, visible light transmittance Tv and transmittances $T_{1.45}$ and $T_{1.9}$ respectively at 1450 nm and 1900 nm, based on "JIS R 3106 (1998)". Ts of 50% or less, Tv of 70% or greater, $T_{1.45}$ of 15% or less and $T_{1.9}$ of 5% or less were judged as having a sufficient heat-ray shielding capability as an architectural or vehicular glass. Haze value was measured by using NDH2000 made by NIPPON DENSHOKU, based on "JIS R 3212 (1998)". A haze value of 0.5% or less was judged as being a level with no practical problem as an architectural or vehicular glass.
  (3) Pencil Hardness Test
  Based on "JIS K 5600 (1999)", a pencil hardness test was conducted. 3H or more was judged as being a hardness of practical use (B), and 7H or more was judged as being a superior hardness (A).

(4) Surface Resistance Value
  Surface resistance value was measured by using MEGARESTA made by SSD Co. In general, it is said that a film containing conductive oxide fine particles, exceeding 100MΩ in surface resistance value, shows a radio transmission property comparable to that of normal glass. In the present invention, in case that the surface resistance value has exceeded 100MΩ, one was judged as having a good radio transmission property.
  (5) Film Thickness
  The film was cut off with a utility knife, and it was measured with a step height measurement mode of SURFCORDER ET4000A made by Kosaka Laboratory Ltd.

Example 1

Preparation of the Treatment Agent 15.5 g of methyltriethoxysilane (MTES), 23.5 g of propylene glycol monoethyl ether, and 11 g of 0.5N acetic acid were mixed together, followed by stirring at 50° C. for 72 hr, thereby obtaining a sol solution.

Then, there were mixed together 5 g of the sol solution and 5 g of a solution (the content of ITO ultra-fine particle: 30 wt %; solvent: isopropyl alcohol; ITO fine particles-dispersed liquid (30 wt %) made by Mitsubishi Materials Corporation), in which ITO ultra-fine particles having an average particle diameter of 50 nm had been dispersed, thereby obtaining a treatment agent.

The organic solvent component in the treatment agent contained 40 wt % of propylene glycol monoethyl ether and 60 wt % of isopropyl alcohol (iPA). The total concentration of the silicon compound and the ITO ultra-fine particles was 26.7 wt %.

(Preparation of Heat-Ray Shielding Film-Formed Base Member)

The surface of a UV cut green glass base member (Ts=47.3%, Tv=74.5%, $T_{1.45}$=33.2%, $T_{1.9}$=46.4%) of 300 mm×300 mm×3.45 mm (thickness) was ground with a grinding liquid, followed by washing with water and drying. The grinding liquid used herein is a 2 wt % ceria suspension liquid obtained by mixing a glass abrasive, MILEK A(T) (made by MITSUI MINING & SMELTING CO., LTD.), with water.

A cotton cloth (trade name: BEMCOT) impregnated with 1cc of the above treatment agent was brought into contact with the base member with a hand operation, and the applied treatment agent was sufficiently spread on the entire surface of one side of the base member with the cotton cloth. As a result, there was a small loss due to the impregnation of the cotton cloth, but almost the total amount adhered onto the substrate.

Then, it was baked at 200° C. for 10 min, followed by cooling to room temperature, thereby obtaining a heat-ray shielding film-formed base member having a good external appearance. The values of physical properties of the obtained base member are shown in Table 1. In the present example, there were shown a low haze value and a good heat-ray shielding property. The surface resistance value also exceeded 100MΩ, and the film thickness was 1.6 μm.

The heat-ray shielding film-formed base member was sectioned, and a cross section of the heat-ray shielding film was observed by a scanning electron microscope in accordance with JIS H 7804 (2005). With this, the average particle diameter of the ITO fine particles was about 50 nm.

TABLE 1

| | Binder Components | | | | Heat-ray | Solvent Ratio | | | |
|---|---|---|---|---|---|---|---|---|---|
| | TEOS | TMOS | MTES | GPTMS | Curing Catalyst | Shielding Component | Propylene Glycol Monoethyl Ether | iPA | Baking Temp. | External Appearance |
| Glass Substrate | — | — | — | — | — | — | — | — | — | — |
| Example 1 | — | — | 100 | — | — | ITO | 40 wt % | 60 wt % | 200° C. | B |
| Example 2 | — | — | 100 | — | — | ITO | 40 wt % | 60 wt % | 250° C. | B |
| Example 3 | — | — | 100 | — | — | ITO | 40 wt % | 60 wt % | 200° C. | B |
| Example 4 | 70 | — | 30 | — | — | ITO | 48 wt % | 52 wt % | 200° C. | A |
| Example 5 | 10 | — | 90 | — | — | ITO | 48 wt % | 52 wt % | 200° C. | B |
| Example 6 | 58 | — | — | 42 | — | ITO | 48 wt % | 52 wt % | 160° C. | B |
| Example 7 | 58 | — | — | 42 | DBDA | ITO | 48 wt % | 52 wt % | 200° C. | B |
| Example 8 | — | 70 | — | 30 | — | ITO | 52 wt % | 48 wt % | 200° C. | A |
| Com. Ex. 1 | — | — | 100 | — | — | ITO | 0 wt % | 100 wt % | 200° C. | F |
| Com. Ex. 2 | 100 | — | — | — | — | ITO | 40 wt % | 60 wt % | 200° C. | F |
| Com. Ex. 3 | — | — | 100 | — | — | ATO | 40 wt % | 60 wt % | 200° C. | F |

| | Optical Characteristics (%) | | | | | Pencil Hardness | Surface Resistance Value (Ω) | Film Thickness (μm) |
|---|---|---|---|---|---|---|---|---|
| | Ts | Tv | $T_{1.45}$ | $T_{1.9}$ | Haze | | | |
| Glass Substrate | 47.3 | 74.5 | 33.2 | 46.4 | 0.1 | — | — | — |
| Example 1 | 41.2 | 72.6 | 2.4 | 0.2 | 0.3 | 5H | B | $>10^{12}$ | 1.6 |
| Example 2 | 42.2 | 73.1 | 11.2 | 1.3 | 0.3 | 5H | B | $>10^{12}$ | 1.6 |
| Example 3 | 39.2 | 71 | 3.4 | 0.1 | 0.3 | 4H | B | $>10^{12}$ | 1.8 |
| Example 4 | 42.5 | 72.4 | 6.9 | 1.7 | 0.3 | 8H | A | $>10^{12}$ | 1.3 |
| Example 5 | 42.8 | 72.9 | 9.2 | 2.2 | 0.2 | 5H | B | $>10^{12}$ | 1.5 |
| Example 6 | 41.6 | 72.4 | 3.3 | 0.8 | 0.2 | 8H | A | $>10^{12}$ | 1.6 |
| Example 7 | 42.2 | 72.6 | 6.9 | 1.1 | 0.2 | 9H | A | $>10^{12}$ | 1.6 |
| Example 8 | 40.6 | 71.2 | 8.4 | 1.9 | 0.1 | 9H | A | $>10^{12}$ | 1.4 |
| Com. Ex. 1 | — | — | — | — | 0.6 | — | — | — |
| Com. Ex. 2 | — | — | — | — | — | — | — | — |
| Com. Ex. 3 | — | — | — | — | 8.6 | — | — | — |

Example 2

A heat-ray shielding film-formed base member was obtained by the same procedure as that of Example 1, except in that the baking temperature was adjusted to 250° C., and the same evaluations as those of Example 1 were conducted. The heat-ray shielding film-formed base member obtained by the present example showed a low haze value and a good heat-ray shielding property.

Example 3

The application of the treatment agent was conducted by using spraying. Except that, a heat-ray shielding film-formed base member was obtained by the same procedure as that of Example 1, and the same evaluations as those of Example 1 were conducted. The heat-ray shielding film-formed base member obtained by the present example showed a low haze value and a good heat-ray shielding property.

Example 4

Preparation of the Treatment Agent 16.0 g of tetraethoxysilane (TEOS), 6.6 g of methyltriethoxysilane (MTES), 16.4 g of propylene glycol monoethyl ether, and 11 g of 0.5N acetic acid were mixed together, followed by stirring at 40° C. for 24 hr, thereby obtaining a sol solution.

Then, there were mixed together 10 g of the sol solution and 5 g of a solution (the content of ITO ultra-fine particle: 30 wt %; solvent: isopropyl alcohol; ITO fine particles-dispersed liquid (30 wt %) made by Mitsubishi Materials Corporation), in which ITO ultra-fine particles having an average particle diameter of 50 nm had been dispersed, thereby obtaining a treatment agent.

The organic solvent component in the treatment agent contained 48 wt % of propylene glycol monoethyl ether and 52 wt % of isopropyl alcohol (iPA). The total concentration of the silicon compound and the ITO ultra-fine particles was 20 wt %. Then, the application and the baking were conducted in the same manners as those of Example 1. As a result, a high hardness of 8H was shown in pencil hardness test.

Example 5

A heat-ray shielding film-formed base member was obtained by the same procedure as that of Example 4, except in that a sol was obtained by using 2.9 g of tetraethoxysilane (TEOS), 19.7 g of methyltriethoxysilane (MTES), 16.4 g of propylene glycol monoethyl ether, and 11 g of 0.5N acetic acid as starting materials, and the same evaluations as those of Example 1 were conducted. As a result, a hardness of 5H, which is sufficient in practical use, was shown in pencil hardness test.

Example 6

Preparation of the Treatment Agent 9.05 g of tetraethoxysilane (TEOS), 2.84 g of γ-glycidoxypropyltrimethoxysilane (GPTMS), 9.86 of propylene glycol monoethyl ether, and 8.25 g of 0.5N acetic acid were mixed together, followed by stirring at room temperature for 24 hr, thereby obtaining a sol solution.

Then, there were mixed together 10 g of the sol solution and 5 g of a solution (the content of ITO ultra-fine particle: 30 wt %; solvent: isopropyl alcohol; ITO fine particles-dispersed liquid (30 wt %) made by Mitsubishi Materials Corporation), in which ITO ultra-fine particles having an average particle diameter of 50 nm had been dispersed, thereby obtaining a treatment agent.

The organic solvent component in the treatment agent contained 48 wt % of propylene glycol monoethyl ether and 52 wt % of isopropyl alcohol (iPA). The total concentration of the silicon compound and the ITO ultra-fine particles was 20 wt %. Then, the application was conducted in the same manner as those of Example 1. Furthermore, the baking was conducted at 160° C. The same evaluations as those of Example 1 were conducted. As a result, a high hardness of 8H was shown in pencil hardness test.

Example 7

A sol solution was obtained by the same procedure as that of Example 6. Then, 10 g of the sol solution and 5 g of the ITO ultra-fine particles were mixed together, and then 0.01 g of dibutyl tin diacetate (DBDA) were added as the curing catalyst, followed by stirring for 1 hr, thereby obtaining a treatment agent. Then, the application was conducted in the same manner as that of Example 1, and the baking was conducted at 200° C. The same evaluations as those of Example 1 were conducted. As a result, a high hardness of 9H was shown in pencil hardness test.

Example 8

Preparation of the Treatment Agent 5.32 g of tetramethoxysilane (TMOS), 1.27 g of γ-glycidoxypropyltrimethoxysilane (GPTMS), 7.59 g of propylene glycol monoethyl ether, and 5.82 g of 0.5N acetic acid were mixed together, followed by stirring at room temperature for 24 hr, thereby obtaining a sol solution.

Then, there were mixed together 10 g of the sol solution and 5 g of the ITO ultra-fine particles-dispersed liquid, thereby obtaining a treatment agent. The organic solvent component in the treatment agent contained 52 wt % of propylene glycol monoethyl ether and 48 wt % of isopropyl alcohol (iPA). Then, the application was conducted in the same manner as that of Example 1, and the baking was conducted at 200° C. The same evaluations as those of Example 1 were conducted. As a result, a high hardness of 9H was shown in pencil hardness test.

Comparative Example 1

A heat-ray shielding film-formed base member was obtained by the same procedure as that of Example 1, except in that isopropyl alcohol was used as a solvent for obtaining the sol solution. As a result, there were many external appearance defects such as pinholes, and the haze value was a high value of 0.6%.

Comparative Example 2

A heat-ray shielding film-formed base member was obtained by the same procedure as that of Example 1, except in that tetraethoxysilane (TEOS) was used in place of MTES. As a result, there were observed external appearance defects formed as a main cause of cracks occurred at the film surface.

Comparative Example 3

A heat-ray shielding film-formed base member was obtained by the same procedure as that of Example 1, except in that antimony-doped tin oxide (ATO) ultra-fine particles (the content of the ATO ultra-fine particles: 30 wt %, solvent: water; made by ISHIHARA SANGYO KAISHA LTD., SN-100D) were used in place of the ITO ultra-fine particles. There was obtained a film having a high haze value, which is considered to have been caused by aggregation of the fine particles generated during the preparation of the treatment agent.

The invention claimed is:

1. A process for producing a heat-ray shielding film-formed base member comprising the steps of:
    (a) mixing a sol solution, formed by using a starting raw material of trialkoxysilane and tetraalkoxysilane, with a solution in which tin-doped indium oxide ultra-fine particles having an average particle diameter of 200 nm or less are dispersed, to make a treatment agent; and
    (b) applying the treatment agent on the base member to form a film on the base member,
    wherein the treatment agent comprises an organic solvent having a boiling point of 100-200° C. as a dispersion medium,
    wherein the applying is conducted by bringing a member retaining the treatment agent into contact with the base member or by spraying the treatment agent on the base member,
    wherein the formed film has a haze value of 0.5% or less,
    wherein amounts of silicon compound derived from the trialkoxysilane and tetraalkoxysilane are present in the treatment agent in a weight ratio of silicon compound to tin-doped indium oxide ultra-fine particles of from 2:8 to 7:3, and
    wherein the amount of the silicon compound derived from the tetraalkoxysilane is between 1 and 4 times by weight the amount of the silicon compound derived from the trialkoxysilane.

2. A process according to claim 1, wherein the organic solvent having a boiling point of 100-200° C. constitutes 30 wt % or greater of all solvents in the treatment agent.

3. A process according to claim 1, wherein the film is made to have a pencil hardness of 3H or greater by heating at 50-300° C. after applying the treatment agent on the base member.

4. A process according to claim 1, wherein the organic solvent having a boiling point of 100-200° C. is a propylene glycol monoalkyl ether series solvent.

5. A process according to claim 1, wherein an organic metal complex is additionally added in step (a).

6. A process according to claim 1, wherein the trialkoxysilane is at least one selected from the group consisting of butyltrimethoxysilane, isobutyltrimethoxysilane, phenyltrimethoxysilane, 3-glycidoxypropyltrimethoxysilane, 3-glycidoxypropyltriethoxysilane, methyltrimethoxysilane, and methyltriethoxysilane.

7. A process according to claim 1, wherein the tetraalkoxysilane is at least one selected from the group consisting of tetramethoxysilane, tetraethoxysilane, tetrapropoxysilane, and tetraisopropoxysilane.

8. A process according to claim 1, wherein the tetraalkoxysilane is at least one selected from the group consisting of tetramethoxysilane and tetraethoxysilane.

9. A treatment agent for forming a heat-ray shielding film on a base member, the treatment agent being obtained by mixing a sol solution, formed by using a starting raw material of trialkoxysilane and tetraalkoxysilane, with a solution in which tin-doped indium oxide ultra-fine particles having an average particle diameter of 200 nm or less are dispersed, wherein the treatment agent comprises an organic solvent having a boiling point of 100-200° C. as a dispersion medium, wherein amounts of silicon compound derived from the trialkoxysilane and tetraalkoxysilane are present in the treatment agent in a weight ratio of silicon compound to tin-doped indium oxide ultra-fine particles of from 2:8 to 7:3, and wherein the amount of the silicon compound derived from the tetraalkoxysilane is between 1 and 4 times by weight the amount of the silicon compound derived from the trialkoxysilane.

* * * * *